UNITED STATES PATENT OFFICE.

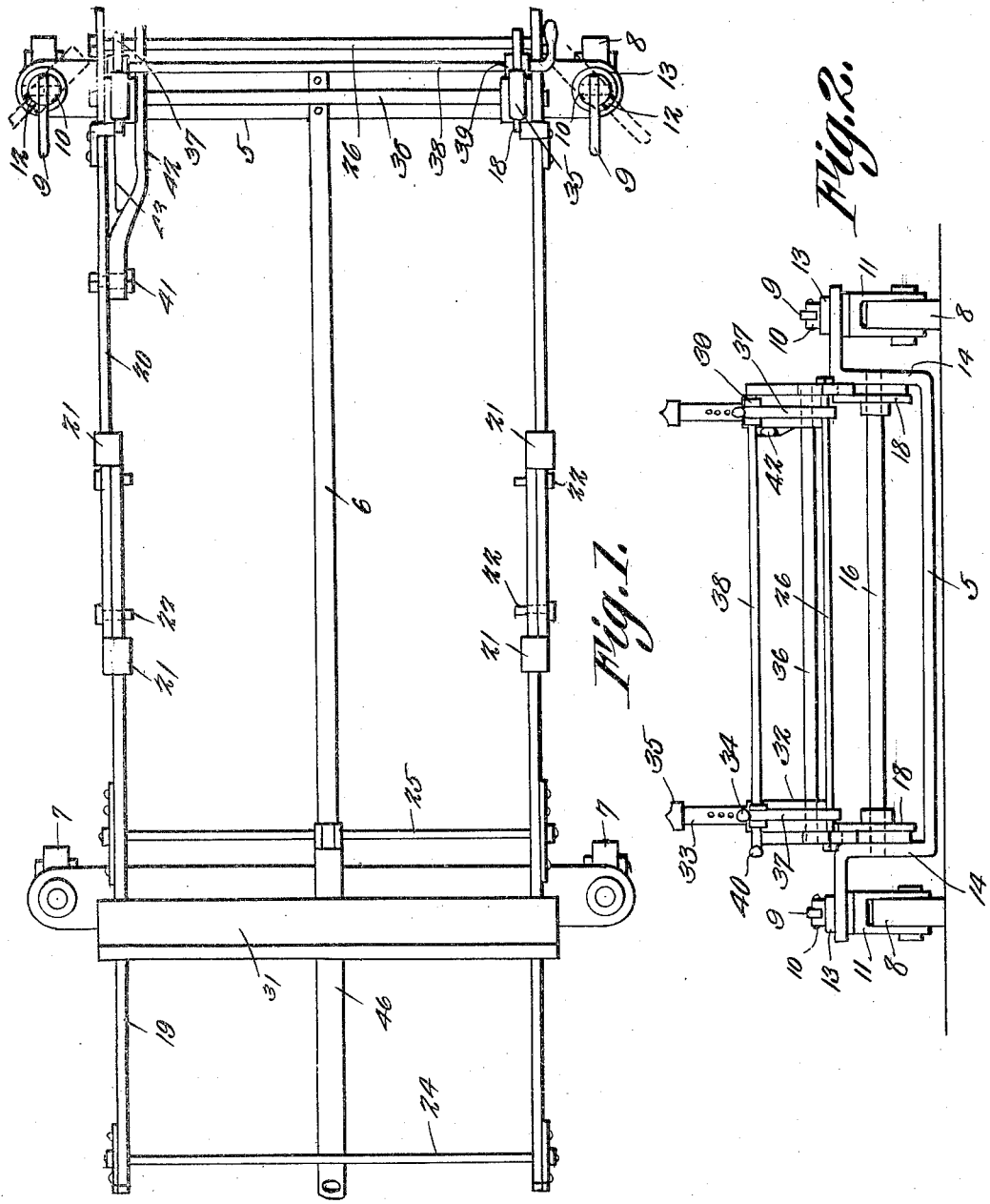

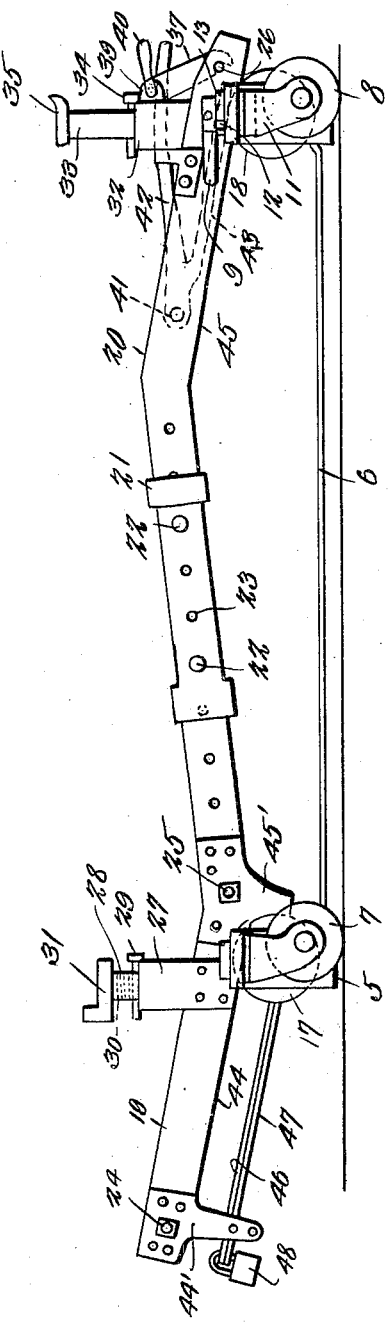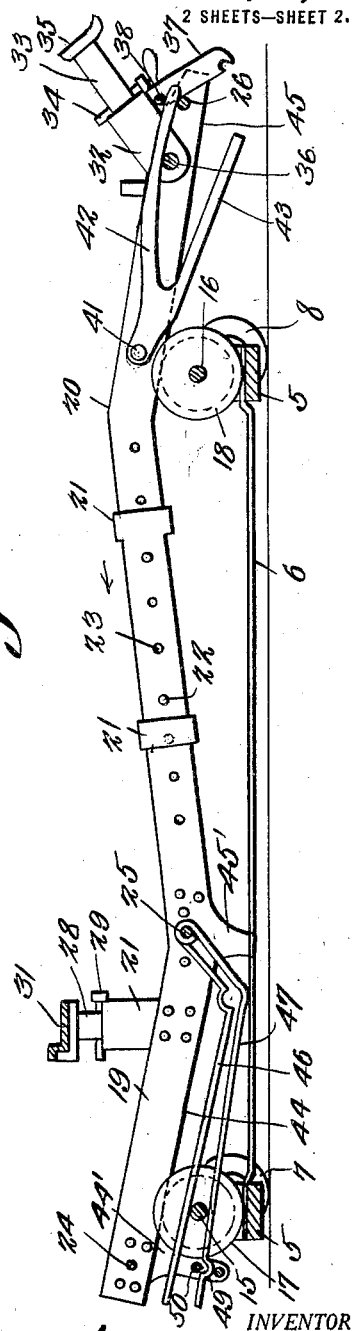

WILLIAM J. SEAS, OF BALTIMORE, MARYLAND, ASSIGNOR TO WILLIAM W. LEISTER, OF QUAKERTOWN, PENNSYLVANIA.

AUTOMOBILE-LIFTER.

1,341,621.   Specification of Letters Patent.   Patented May 25, 1920.

Application filed July 23, 1919. Serial No. 312,826.

*To all whom it may concern:*

Be it known that I, WILLIAM J. SEAS, a citizen of the United States, residing at Baltimore, State of Maryland, have invented certain new and useful Improvements in Automobile-Lifters, of which the following is a specification.

This invention relates to improvements in lifting devices or jacks for motor vehicles, and more particularly to devices of that kind by which the vehicle is elevated from the ground by the force of the impact of the vehicle when it is driven into position above the device.

The invention has for its object to provide a device of the kind stated which is automatic in operation, and simple in construction, and also one which is portable so that it may readily be moved about in the garage or other place where the vehicle is to be stored.

With the object stated in view, the invention consists in a novel combination and arrangement of parts to be hereinafter described and claimed, and in order that the same may be better understood, reference is had to the accompanying drawings forming a part of this specification.

In the drawings,

Figure 1 is a plan view of the device;

Fig. 2 is an end view thereof;

Fig. 3 is a side elevation, showing the position of the parts when the vehicle is elevated, and Fig. 4 is a longitudinal section showing the parts in lowered position.

Referring specifically to the drawings, the lifting device is mounted on a truck and is slidable lengthwise thereon, by which action it rises to elevate the vehicle. The truck is composed of end cross bars 5 connected by a longitudinal bar 6 and carrying front and rear wheels 7 and 8, respectively. The entire device is mounted on this truck and it can therefore be readily transported with or without the vehicle thereon. The cross bars 5 have a downward drop between the truck wheels as shown in Fig. 2, to come close to the ground, and at their ends they are above the wheels, the latter being caster wheels. The rear wheels 8 are provided with means whereby they may be locked in position obliquely to the truck as shown dotted in Fig. 1, this being for the purpose of preventing forward movement of the truck when the device is about to be used. The oblique position of the wheels prevents the truck from sliding forward. The locking means comprise hand levers 9 pivoted to the upper ends of the pivot stems 10 of the frames 11 carrying the wheels 8, said levers being adapted to be swung down to seat in locking recesses 12 in collars 13 fixed on top of the ends of the cross bar 5.

Inside the wheels 7 and 8, the vertical portions 14 of the cross bars 6 carry transverse axles 15 and 16, respectively. The front axle 15 is provided with flanged wheels 17, and the rear axle 16 has flanged wheels 18.

The lifter frame to be presently described is slidably supported on the wheels 17 and 18, and it is so constructed that it rises when slid in one direction, and is lowered when slid in the opposite direction.

The lifter frame is composed of a pair of laterally spaced side bars, each of which is composed of slidably connected front and rear sections 19 and 20, respectively, lapping at their inner ends, each section having a part 21 which embraces the other section. Pins 22 passed through alining apertures in the lapping parts lock the two sections in adjusted position. It will be evident from the foregoing that the side bars can be lengthened or shortened to adapt the device for vehicles of various lengths.

The front sections 19 are connected by end and intermediate tie rods 24 and 25, respectively, and the rear sections 20 are connected by an end tie rod 26.

The sections 19 carry upright hollow members 27, each of which seats a post 28 which is vertically adjustable and maintained in adjusted position by a cross pin 29 insertible through one of a series of holes 30 in the post. The two posts 28 carry at their upper ends a seat 31 in the form of a cross bar, adapted to receive the front axle of the vehicle to be elevated.

The sections 20 each carry a hollow member 32 slidably seating a post 33 which is vertically adjustable and held in adjusted position by a cross pin 34 in the same manner as the posts 28. At the top of each post 33 is a seat 35 adapted to receive the rear axle of the vehicle to be elevated.

The members 32 are not rigidly connected to the sections 20, but are pivotally supported by a cross shaft 36 extending therebetween. The members 32 and the parts carried thereby can therefore be tilted rearwardly as shown in Fig. 4.

For locking the members 32 in upright position, as shown in Fig. 3, they are provided with latch hooks 37 adapted to engage the tie rod 26, and carried by a rock shaft 38 supported by ears 39 on the members. At one end of the shaft 38 is a handle 40.

To the inner face of one of the sections 20 is connected a lifting device for the members 32, the same being a lever which is pivoted as shown at 41 to said section and has two rearwardly extending branches 42 and 43, respectively. The lever branch 42 seats beneath the shaft 38, and the branch 43 is positioned to ride on the wheel 18 when the lifting frame is slid forwardly.

Referring to Figs. 3 and 4, it will be seen that the sections 19 and 20 of the lifting frame bars are shaped to obtain front and rear inclined surfaces 44 and 45, respectively, at the bottom. The front inclines engage the wheels 17 and the rear inclines engage the wheels 18, and the rise in the inclines is in the direction of the front end of the lifting frame. When the frame is down, the wheels 17 and 18 are at the highest portions of the inclines as shown in Fig. 4, and hence it will be seen that when the frame is pushed forwardly the inclines elevate the frame until the lowest portions of the inclines engage the wheels as shown in Fig. 3. As the seats 31 and 35 are carried by the frame, the vehicle supported by said seats is elevated bodily with the frame. To lower the vehicle it is necessary only to return the frame to its lowermost position, which is done by sliding the frame back to the position shown in Fig. 3. The seats 31 and 35 are vertically adjustable according to the height of the vehicle axles from the ground, the adjustment being made so that the wheels of the vehicle are clear of the ground when it is elevated by the forward movement of the lifting frame.

On the frame sections 19 are depending stop brackets 44' and 45' located respectively in front of and to the rear of the wheels 17 and intercepted by the latter at the limits of the travel of the lifting frame.

For locking the lifting frame in elevated position, the following device is provided:

To the tie bar 25 are hinged locking bars 46 and 47 adapted to embrace the axle 15 and to be locked thereto by a padlock 48 applied to their free ends, the bottom bar 47 having a seat 49 engageable with a cross rod 50 carried by the brackets 44'. It will be seen that when the bars are closed up around the axle 15 and locked as shown in Fig. 3, the lifting frame cannot slide down to lower the vehicle. The bars 46 and 47 are shaped intermediate their ends to form a seat for the axle 15.

The operation of the device may be summarized as follows:

Fig. 4 shows the device ready to receive the vehicle, the lifting frame being down and the seat 35 being tilted rearwardly and thus lowered out of the way of the front axle of the vehicle. The vehicle can now be driven to come above the device it being driven over the same until its front axle strikes the seat 31. The impact against the seat 31 slides the lifting frame forward on the wheels 17 and 18 and by reason of the inclines 44 and 45 the frame is elevated. When the frame starts to move forward, the lever part 43 slides over the wheel 18, whereupon the lever part 42 engages the shaft 38 and swings the member 32 to upright position to place the seats 35 beneath the rear axle of the car, in which position the members are automatically locked by the latch hooks 37 engaging the rod 26 as shown in Fig. 3. The parts are so designed that the seats 35 come beneath the rear axle of the vehicle at the same time the frame starts to move forwardly and they follow the axle and remain under the same to elevate it as the frame rises. At the end of the forward movement of the frame the bracket 45' strikes the wheels 17 and prevents further movement of the frame in this direction, and the vehicle is now supported with its wheels clear of the ground.

I claim:

1. A lifting device comprising a longitudinally movable lifting frame having inclines, a supporting frame having rolling supports engageable by the inclines, wheels on the supporting frame adjustable to extend obliquely thereto to prevent movement of said frame, and means for locking the wheels in such position.

2. A lifting device comprising a longitudinally movable lifting frame having inclines, a supporting frame having means engageable by the inclines and coöperating therewith to raise and lower the lifting frame, wheels on the supporting frame adjustable to extend obliquely thereto to prevent movement of said frame, and means for locking the wheels in such position.

3. A lifting device comprising a longitudinally movable lifting frame, a supporting frame, coacting means on said frames for raising and lowering the lifting frame, wheels on the supporting frame adjustable to extend obliquely thereto to prevent movement of said frame, and means for locking the wheels in such position.

4. A lifting device comprising a longitudinally movable lifting frame, a supporting frame, coacting means on the frames for raising and lowering the lifting frame, front and rear vehicle axle seats on the lifting frame, the rear axle seat being pivoted to swing in a vertical plane, and occupying a tilted position when the lifting frame is in lowered position, a lever pivoted to the lifting frame and engageable with the seat, and means on the supporting frame engageable with the lever for actuating the same to swing the seat to erect position.

5. A lifting device comprising a longitudinally movable lifting frame having inclines, a supporting frame having rolling supports engageable by the inclines, front and rear vehicle axle seats on the lifting frame, the rear seat being pivoted to swing in a vertical plane and occupying a tilted position when the lifting frame is in lowered position, and a lever pivoted to the lifting frame and engageable with the seat for swinging the same to erect position, said lever being intercepted by one of the rolling supports and actuated thereby when the lifting frame moves in a direction to rise.

In testimony whereof I affix my signature in the presence of two witnesses.

WILLIAM J. SEAS.

Witnesses:
  E. WALTON BREWINGTON,
  HOWARD D. ADAMS.